US008692525B2

(12) United States Patent
Wiesner

(10) Patent No.: US 8,692,525 B2
(45) Date of Patent: Apr. 8, 2014

(54) ELECTRICAL POWER TOOL FOR OPERATING WITH ALTERNATING CURRENT

(75) Inventor: Bernd Wiesner, Owen (DE)

(73) Assignee: Metabowerke GmbH, Nuertingen (DE)

( * ) Notice: Subject to any disclaimer, the term of this patent is extended or adjusted under 35 U.S.C. 154(b) by 462 days.

(21) Appl. No.: 13/133,767

(22) PCT Filed: Dec. 11, 2008

(86) PCT No.: PCT/EP2008/010516
§ 371 (c)(1),
(2), (4) Date: Jun. 17, 2011

(87) PCT Pub. No.: WO2010/066270
PCT Pub. Date: Jun. 17, 2010

(65) Prior Publication Data
US 2011/0241577 A1 Oct. 6, 2011
US 2012/0081044 A2 Apr. 5, 2012

(51) Int. Cl.
*G05F 1/247* (2006.01)

(52) U.S. Cl.
USPC ........... 323/260; 323/235; 323/319; 324/510; 324/511; 324/522; 318/62; 318/139; 318/400.26; 318/400.35

(58) Field of Classification Search
USPC ........... 318/62, 139, 400.01, 400.26, 400.32, 318/400.34, 400.35, 430, 432, 671, 673; 324/510, 511, 522; 323/235, 260, 319; 200/43.17; 704/213
See application file for complete search history.

(56) References Cited

U.S. PATENT DOCUMENTS

| 4,737,671 A | 4/1988 | Nutz et al. |
| 7,331,406 B2* | 2/2008 | Wottreng et al. ............. 173/176 |
| 7,551,411 B2* | 6/2009 | Woods et al. .................... 361/33 |
| 2004/0155532 A1* | 8/2004 | Brotto ........................... 307/326 |
| 2008/0284361 A1 | 11/2008 | Walter et al. |

FOREIGN PATENT DOCUMENTS

| DE | 35 22 586 A1 | 1/1987 |
| DE | 10 2005 062 864 A1 | 7/2007 |
| JP | 04 088899 A | 3/1992 |

* cited by examiner

*Primary Examiner* — Antony M Paul
(74) *Attorney, Agent, or Firm* — Harven S. Kauget; Burr & Forman LLP

(57) ABSTRACT

The invention relates to an electrical power tool, particularly an electric hand power tool, for operating with alternating current, having an electric motor, and electronic control device, and an electrical power switch for actuating the electric motor, wherein the electronic control device comprises a bias voltage output and a detection input, connected to each other by means of a voltage divider comprising a summation point and to the side of the power switch facing the electric motor, and the control device is further designed such that the potential at the detection input is monitored after actuating the power switch and used for checking whether the power switch is conducting, and that it is actuated again if the power switch was not conducting or returned to the non-conducting state during the monitoring, and that said checking and any renewed actuation of the power switch is repeated within a half-wave of the alternating voltage.

38 Claims, 3 Drawing Sheets

ELECTRICAL POWER TOOL FOR OPERATING WITH ALTERNATING CURRENT

FIELD OF THE INVENTION

The invention relates to an electric power tool, in particular a handheld electric power tool, for operating with alternating current, having an electric motor, an electronic control device and an electric power switch for actuating the electric motor.

BACKGROUND

Electric power tools of this kind are known. The electric motor of electric power tools of this kind is typically supplied with a generally single-phase AC mains voltage by phase gating control. This is done in the manner of phase gating control by the electric power switch being "triggered", that is to say switched to the on state, by application of a control potential or control current (triggering pulse) by the electronic control device, so that a motor current can flow as a result of the voltage applied to the electric motor. One problem which frequently arises is that of so-called "faulty triggering", that is to say that the power switch has not been switched to the on state or has returned to the off state, for example because the triggering moment did not occur after, but rather shortly before, a zero crossing of the motor current, and therefore the power switch was deactivated, that is to say switched to the off state, again by the following current zero crossing.

In order to ensure reliable operation and rotation of the electric motor, which is a universal motor in particular, it is necessary to ensure that the power switch is duly switched to the on state in accordance with prespecified powers as intended at the correct time during a half-wave of the AC voltage, and also remains in the on state.

To this end, it is feasible, for example, for triggering to be monitored by measuring the voltage across the power switch. It would also be feasible for the motor current to be measured; however, a low-resistance measurement resistor which, for its part, would in turn require an amplifier arrangement for the measurement signal, would have to be used for this purpose. Both these measures are complex and costly to implement in respect of hardware. Outputting several triggering pulses one after the other at a predefined time interval would result in the unnecessary consumption of triggering current in the case in which the power switch is duly in the on state. In addition, a power supply part forming the several triggering pulses would have to be of correspondingly complex design.

The present invention is based on the object of providing an electric power tool of the type described in the introductory part in which reliable actuation of the electric motor as intended and as required is ensured in an economical manner.

According to the invention, this object is achieved by an electric power tool of said type in that the electronic control device comprises a bias voltage output and a detection input which are connected to one another and to that side of the circuit breaker which faces the electric motor via a voltage divider which has a summation point, and the control device is further designed such that the potential across the detection input after respective triggering of the power switch is monitored, and, on the basis of this, a check is made as to whether the power switch is on, and that it is triggered again if the power switch was not on or had returned to the off state during monitoring, and that this check and possibly renewed triggering of the power switch is repeated within a half-wave of the AC voltage.

Monitoring triggering of the power switch in this way using a circuit arrangement having two resistors in conjunction with a bias voltage output and a detection input of the electronic control device, which typically comprises a microcontroller, is associated with an extremely low level of possible costs of implementation in respect of hardware. In addition, the requirements made of programming of the electronic control device which is required for this purpose are relatively low. All that is necessary following a triggering pulse is that preferably continuous, that is to say not only intermittent, monitoring of the potential across the detection input of the control device be carried out. To this end, a signal is available at the voltage divider and therefore at the detection input immediately after triggering of the power switch, said signal, in this way, allowing basically immediate assessment of the state of the power switch (on or off).

Therefore, according to the invention, a check as to whether the power switch has been triggered as intended and also continuously remains in the on state is made by the control device immediately after triggering of the power switch. If this is not the case, this is detected by virtue of a change in signal at the detection input of the control device and the further control measures can be executed, specifically renewed triggering of the power switch as required. The potential across the detection input is again monitored immediately after this and a check is made as to whether this further triggering of the power switch leads to continuous "success" or whether the power switch returns to the off state again, and therefore still further triggering is initiated.

The power switch is advantageously a triac. The invention can also be advantageously used in multi-phase systems.

The check and, if required, triggering of the power switch are carried out at most ten times, in particular at most eight times, in particular at most six times, and further particularly at most five times, within a half-wave according to one embodiment of the invention. It has proven advantageous for the number of checks and, if required, triggering operations of the power switch to be performed at most x times, where $x = T_{half-wave}/T_{triggering\ sequence}$. In this case, $T_{triggering\ sequence}$ denotes the time interval between two triggering operations which is predefined in the control arrangement.

If it is established during the check that the power switch is off, it may prove advantageous for post-triggering to be performed immediately, that is to say as rapidly as possible, as soon as the check of the signal at the detection input has shown that the power switch is off. This may be the case, in particular, when the power switch is initially triggered in the middle of a half-wave.

However, it may also prove advantageous, in a development of the invention, for the electronic control device to be designed such that post-triggering takes place only after a predefined time interval, so that the triggering sequence or $T_{triggering\ sequence}$ lasts for 5 to 500 µs, in particular 100 to 500 µs, in particular 150 to 400 µs and preferably 200 to 300 µs. This may be the case, in particular, when the power switch is initially triggered at the beginning of a half-wave, for example when the current zero crossing has not yet taken place (in this case, immediate post-triggering would not lead to the desired result since the following current zero crossing would re-open the power switch).

The triggering period of the power switch lasts for preferably 5 to 40 µs, in particular 15 to 30 µs.

The electronic control device advantageously comprises a synchronization input in order to detect the zero crossing of the respective half-wave. This is intended to prevent the power switch from being triggered too early, that is to say, for example, during a time interval when the actual motor current is "lagging", that is to say is still ahead of the respective current zero crossing, on account of inductive loads of the electric motor. In such a case, the power switch could be switched to the on state by triggering, but (as already mentioned above) it would immediately return to the off state again at the subsequent zero crossing of the motor current. Preferably exact triggering of the power switch in relation to the half-wave of the relevant phase also proves advantageous in order to actuate the electric motor as required.

The electronic control device is further advantageously designed such that the bias voltage output is operated with a negative control voltage (low), in particular of −5 volts, during a positive half-wave, and with a comparatively higher potential, in particular zero volt, (high) during a negative half-wave.

The present invention also relates to a method for operating an electric power tool having the features of claim 10.

BRIEF DESCRIPTION OF THE DRAWINGS

Further features, details and advantages of the invention can be found in the appended patent claims and in the illustration in the drawing and the following description of a preferred embodiment of the invention. In the drawing:

DETAILED DESCRIPTION OF THE INVENTION

Figure 1:
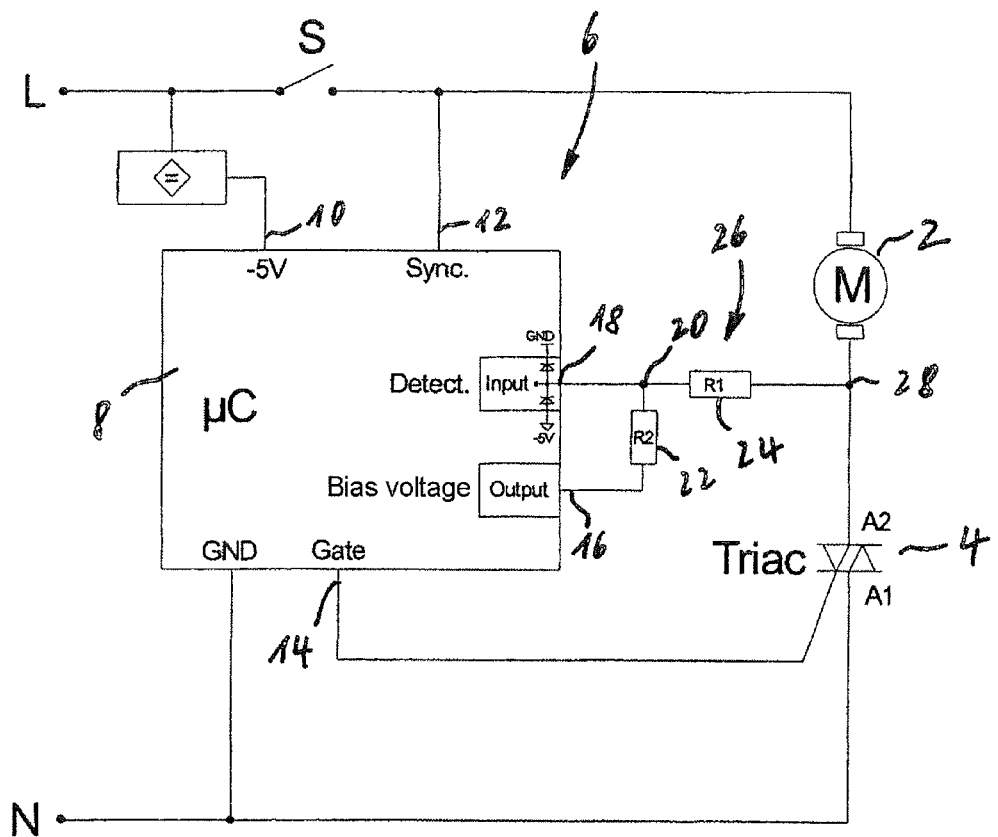
FIG. 1 shows a schematic illustration of power supply and actuation in an electric power tool according to the invention.

FIG. 1 illustrates the supply of electrical power to an electric motor 2 in an electric power tool according to the invention. A phase L of an electrical AC mains voltage and the neutral conductor N are illustrated. One electrical connection of a winding of the electric motor 2 is connected to the phase L, and the other is connected to the neutral conductor N with the interposition of a power switch 4. An electronic control device which is denoted overall by reference symbol 6 and has a microcontroller 8 is also illustrated. The electronic control device 6 or the microcontroller 8 is supplied with an operating voltage of −5 V directly by the one phase L (operating voltage input 10). A synchronization input 12 is also provided, and therefore the electronic control device 6 can always be synchronized with respect to a zero crossing of the voltage of the relevant phase L, that is to say the time of control processes in relation to the zero crossing of the voltage of the phase L of the mains voltage can be temporally defined. The power switch 4, which is preferably in the form of a triac, is actuated by means of a control output 14 from the microcontroller 8 of the electronic control device 6 by a control pulse (triggering pulse) being applied to the power switch 4 in order to switch the power switch 4 to the on state, and therefore the present voltage of the phase L is applied to the electric motor 2 and consequently a motor current flows through the windings of the electric motor. The time of the triggering pulse is selected by the electronic control device 6 to be within a half-wave of the AC voltage, depending on the power requirement. The shorter the time interval between the triggering pulse and the preceding zero crossing of the AC mains voltage, the greater the time integral with respect to electrical power which is supplied to the electric motor 2. However, this is true only if the power switch 4 continuously remains in the on state, that is to say is closed, by virtue of the triggering pulse during the relevant half-wave.

The control device 6 or the microcontroller 8 further comprises a bias voltage output 16 and a detection input 18 which are connected to one another and to a connection 28 of the electric motor 2 via a summation point 20 of a voltage divider 26 which comprises two resistors 22 and 24. Said connection is between the electric motor 2 and the power switch 4, and therefore a potential of the power switch 4 relative to the neutral conductor N can ultimately be tapped off as a result. In this way, according to the invention, a signal is applied to the detection input 18, it being possible to monitor said signal following triggering of the power switch 4 and it being possible for said signal to be used to check the "switching state" of the power switch 4 by virtue of the electronic control device 6.

If, immediately after a triggering pulse is emitted (via the control output 14 from the electronic control device 6), it is established by monitoring the potential across the detection input that the power switch 4 is off or has returned to the off state, a renewed triggering pulse is transmitted to the power switch 4 by the electronic control device 6. This check and possible re-triggering of the power switch 4 during a relevant half-wave of the AC mains voltage can be carried out several times, specifically in accordance with a first embodiment in such a way that post-triggering is performed as rapidly as possible, that is to say virtually immediately, if it is established that the power switch is off, or in accordance with a second embodiment in such a way that a triggering sequence of, in particular, 50 to 500 μs is realized in order to be able to use the available periods of the respective half-wave in as optimum a manner as possible to supply power to the electric motor 2. However, the supply can also advantageously be restricted to a specific number of cycles.

Figure 2:
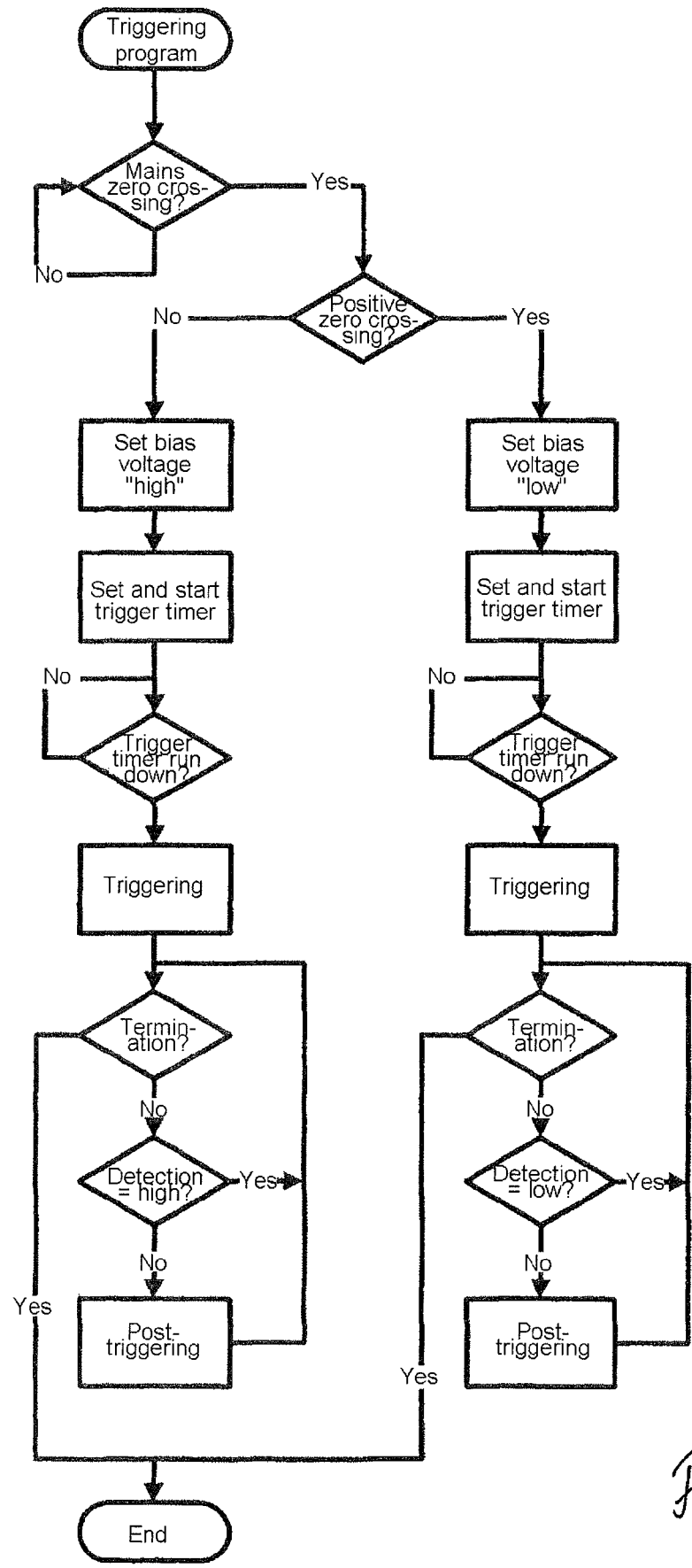
FIG. 2 shows a flowchart for the actuation of the electric power tool according to the invention.
Figure 3:
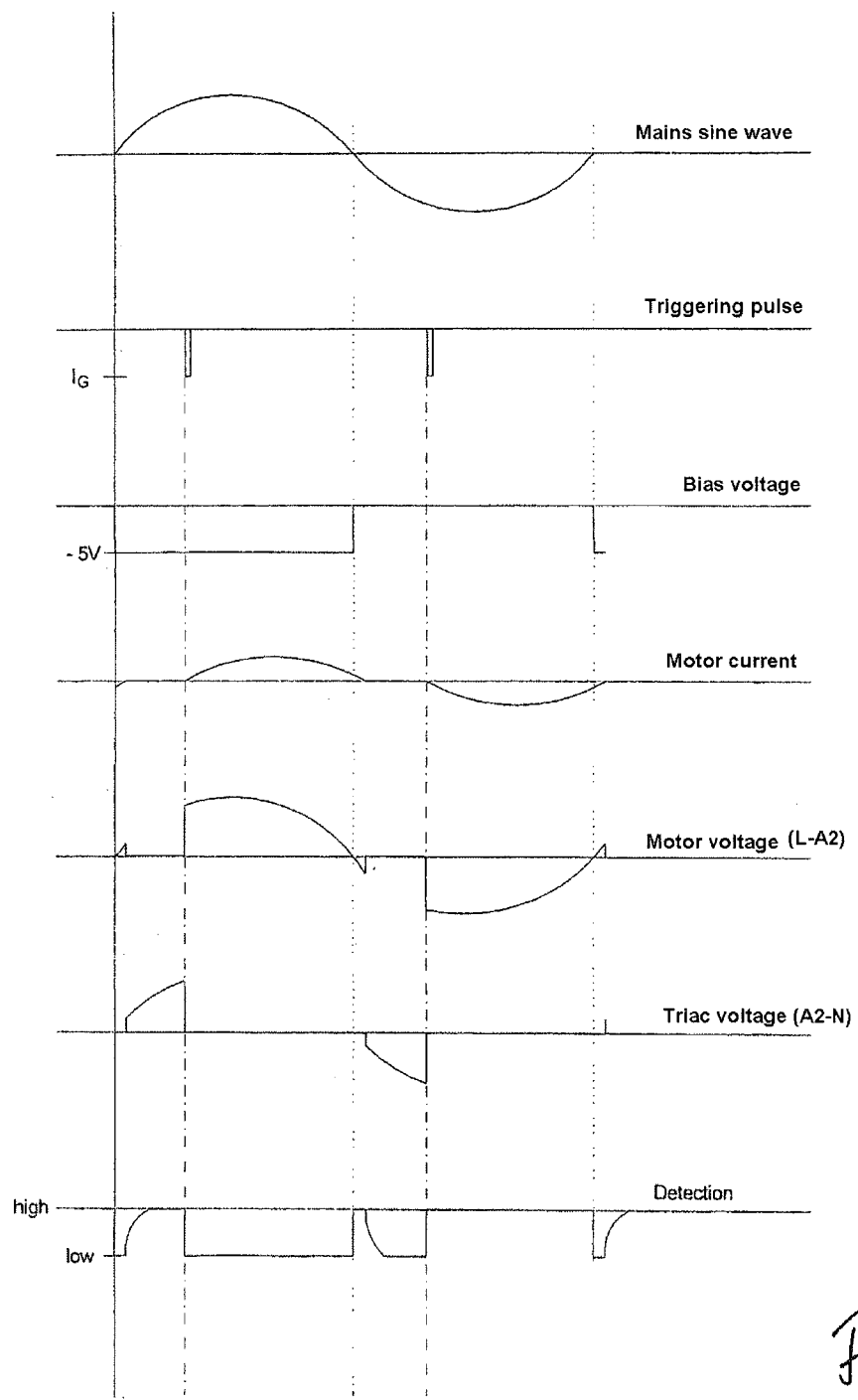
FIG. 3 shows an illustration of the current/voltage parameters during operation of the electric power tool according to the invention.

FIGS. 2 and 3 show, using a flowchart and a voltage and current profile, the operation of the electric power tool according to the invention.

FIG. 3 shows, at the top, one oscillation period of a phase of the AC mains voltage (denoted by mains sine wave). A triggering pulse during the positive and subsequent negative half-wave of the AC voltage of in each case $I_G$, where $I_G$ is advantageously between 1-50 mA, in particular approximately 25 mA, is illustrated beneath said oscillation period with a corresponding orientation in relation to the profile of the voltage of the phase. The bias voltage which is applied to the voltage divider 26 via the bias voltage output 16 of the control device 6 is illustrated beneath said triggering pulse. Said bias voltage is, in the case illustrated by way of example, −5 V (potential low) during the positive half-wave of the AC mains voltage and 0 V (potential high) during the subsequent negative half-wave of the AC mains voltage (only by way of example).

The motor current flowing through a winding of the electric motor 2 is illustrated in the row beneath the bias voltage. It can be seen that, during the course of phase gating control, the motor current flows only after the power switch 4 is triggered, that is to say only when the power switch 4 is switched to the on state, until the subsequent zero crossing of the AC mains voltage (or even somewhat longer on account of inductive effects). The motor voltage, that is to say the motor voltage which is dropped across the two connections of the winding of the electric motor 2 in question, is illustrated beneath the motor current. If the power switch 4 is on and a motor current is flowing, the illustrated motor voltage is dropped across the terminals of the electric motor 2.

In the same way, the voltage which is dropped across the power switch 4 is illustrated beneath the motor voltage.

Finally, the voltage which is applied to the detection input via the summation point 20 of the voltage divider 26 is illustrated in the lowermost row of FIG. 3, said voltage being monitored for control purposes and being used to check whether the power switch 4 is on. In the event of successful triggering of the power switch during the positive half-wave, a low potential (in particular approximately −5 V) is applied to the detection input, specifically until the next zero crossing of the AC mains voltage, but only if the power switch remains in the on state until this time! During the negative half-wave, the voltage across the detection input continuously falls from high potential (in particular 0 V) to low potential (−5 V), until the power switch is switched to the on state as a result of a triggering pulse. The detection input then jumps to high potential, it being possible for this, for its part, to be evaluated by the control device 6 as a test parameter for correct conduction of the power switch 4. Therefore, FIG. 3 shows correct operation of the electric power tool, in the case of which the power switch 4 is ideally closed, as intended, with each triggering pulse, and therefore power is supplied to the electric motor 2.

Operation of the electric power tool according to the invention and the method according to the invention are also shown with reference to the flowchart according to FIG. 2. The routine is such that the electronic control device determines a triggering time for the power switch 4 in accordance with the current power requirement during a half-wave of the AC mains voltage in accordance with programmed prespecifications. In order to correctly position this specific time in relation to the half-wave in question of the phase in question, the time of the zero crossing of the AC mains voltage of this phase is monitored using the synchronization input 12. As soon as the zero crossing is established, a check is made as to whether the zero crossing is a positive zero crossing or a negative zero crossing (a positive zero crossing means the start of the positive half-wave). The flowchart then continues with one or the other path. When there is a positive zero crossing, that is to say at the start of the positive half-wave, the right-hand path of the flowchart is applicable. The potential "low", that is to say, for example, −5 V, is applied to the bias voltage output. The triggering timer is started and, when the triggering timer is run down (above triggering time) for the first time during the half-wave in question in accordance with the prespecification by the control device, a triggering pulse is transmitted to the power switch 4 via the control output 14. The potential across the summation point 20 is then monitored via the detection input 18. If the potential produced is "low" and is produced at the detection input 18 in this form, the power switch 4 is on, that is to say closed, and the mains voltage is applied to the electric motor 2 in accordance with its profile.

If, however, the potential "low" is not produced at the detection input 18, but rather the potential "high" is produced, this is an indication that the power switch 4 has returned to the off state. Immediate post-triggering and renewed monitoring and evaluation of the potential across the detection input 18 then take place. This is carried out cyclically, with the number of cycles within one half-wave expediently being limited, reference being made to this in the introductory part.

A corresponding profile for the negative half-wave can be found in the path of the flowchart which is illustrated on the left-hand side in FIG. 2.

During operation of the electric power tool according to the invention or when executing the method according to the invention, the electric motor can be actuated in an operationally reliable manner with the least possible expenditure on hardware, with a number of triggering pulses which is as low as possible being required, and this being the case only when a preceding triggering operation proves to be a faulty triggering operation or the power switch returns to the off state for other reasons. Further post-triggering is only performed after this, specifically substantially immediately after a faulty switching state of the power switch is established.

What is claimed is:

1. An electric power tool, in particular a handheld electric power tool, for operating with alternating current, having an electric motor, an electronic control device and an electric power switch for actuating the electric motor, characterized in that the electronic control device comprises a bias voltage output and a detection input which are connected to one another and to that side of the circuit breaker which faces the electric motor via a voltage divider which has a summation point, and the control device is further designed such that the potential across the detection input after respective triggering of the power switch is monitored, and, on the basis of this, a check is made as to whether the power switch is on, and that it is triggered again if the power switch was not on or had returned to the off state during monitoring, and that this check and possibly renewed triggering of the power switch is repeated with a half-wave of the AC voltage.

2. The electric power tool as claimed in claim 1, characterized in that the power switch is a triac.

3. The electric power tool as claimed in claim 2, characterized in that the electronic control device is designed such that the check and possibly renewed triggering of the power switch are carried out between five and at most ten times, with a half-wave of the AC voltage.

4. The electric power tool as claimed in claim 2, characterized in that the electronic control device is designed such that the check and possibly renewed triggering of the power switch is carried out at most x times within a half-wave of the AC voltage, where $x = T_{half\text{-}wave} T_{triggering\ sequence}$.

5. The electric power tool as claimed in claim 2, characterized in that the electronic control device is formed such that post-triggering is performed immediately, as soon as the check of the signal at the detection input has shown that the power switch is off.

6. The electric power tool as claimed in claim 2, characterized in that the electronic control device is designed such that the triggering sequence lasts for 50-500 μs.

7. The electric power tool as claimed in claim 2, characterized in that the electronic control device is designed such that the triggering period of the power switch lasts for 5-40 μs.

8. The electric power tool as claimed in claim 2, characterized in that the electronic control device is designed such that the triggering period of the power switch lasts for 5-40 μs.

9. The electric power tool as claimed in claim 2, characterized in that the electronic control device comprises a synchronization input in order to detect the zero crossing of the respective half-wave.

10. The electric power tool as claimed in claim 2, characterized in that the bias voltage output is operated with a negative control voltage during a positive half-wave, and with a comparatively higher potential during a negative half-wave.

11. The electric power tool as claimed in claim 2, characterized in that the bias voltage output is operated with a negative control voltage of −5 volts during a positive half-wave, and with a comparatively higher potential of zero volts during a negative half-wave.

12. A method for operating an electric power tool as clamed in claim 2 with alternating current, with an electric motor being supplied with electrical energy by means of an electronic control device by virtue of phase gating control using an electric power switch, characterized in that monitoring is performed immediately after initial triggering of the power switch by tapping off the voltage at a summation point of a voltage divider and a check is made as to whether the power switch is on, in that, after the initial triggering, the power switch is triggered again if the power switch was not on or had returned to the off state during monitoring, and in that this check and possibly renewed triggering of the power switch is repeated within a half-wave of the AC voltage.

13. The electric power tool as claimed in claim 1, characterized in that the electronic control device is designed such that the check and possibly renewed triggering of the power switch are carried out between 5 and at most 10 times, with a half-wave of the AC voltage.

14. The electric power tool as claimed in claim 13, characterized in that the electronic control device is formed such that post-triggering is performed immediately, as soon as the check of the signal at the detection input has shown that the power switch is off.

15. The electric power tool as claimed in claim 13, characterized in that the electronic control device is designed such that the triggering sequence lasts for 50-500 µs.

16. The electric power tool as claimed in claim 13, characterized in that the electronic control device is designed such that the triggering period of the power switch lasts for 5-40 µs.

17. The electric power tool as claimed in claim 13, characterized in that the electronic control device is designed such that the triggering period of the power switch lasts for 200-300 µs.

18. The electric power tool as claimed in claim 13, characterized in that the electronic control device comprises a synchronization input in order to detect the zero crossing of the respective half-wave.

19. The electric power tool as claimed in claim 13, characterized in that the bias voltage output is operated with a negative control voltage during a positive half-wave, and with a comparatively higher potential during a negative half-wave.

20. The electric power tool as claimed in claim 13, characterized in that the bias voltage output is operated with a negative control voltage of −5 volts during a positive half-wave, and with a comparatively higher potential of zero volts during a negative half-wave.

21. A method for operating an electric power tool as clamed in claim 13 with alternating current, with an electric motor being supplied with electrical energy by means of an electronic control device by virtue of phase gating control using an electric power switch, characterized in that monitoring is performed immediately after initial triggering of the power switch by tapping off the voltage at a summation point of a voltage divider and a check is made as to whether the power switch is on, in that, after the initial triggering, the power switch is triggered again if the power switch was not on or had returned to the off state during monitoring, and in that this check and possibly renewed triggering of the power switch is repeated within a half-wave of the AC voltage.

22. The electric power tool as claimed in claim 1, characterized in that the electronic control device is designed such that the check and possibly renewed triggering of the power switch is carried out at most x times within a half-wave of the AC voltage, where $x = T_{half-wave}/T_{triggering\ sequence}$.

23. The electric power tool as claimed in claim 22, characterized in that the electronic control device is formed such that post-triggering is performed immediately, as soon as the check of the signal at the detection input has shown that the power switch is off.

24. The electric power tool as claimed in claim 22, characterized in that the electronic control device is designed such that the triggering sequence lasts for 50-500 µs.

25. The electric power tool as claimed in claim 22, characterized in that the electronic control device is designed such that the triggering period of the power switch lasts for 5-40 µs.

26. The electric power tool as claimed in claim 22, characterized in that the electronic control device is designed such that the triggering period of the power switch lasts for 200-300 µs.

27. The electric power tool as claimed in claim 22, characterized in that the electronic control device comprises a synchronization input in order to detect the zero crossing of the respective half-wave.

28. The electric power tool as claimed in claim 22, characterized in that the bias voltage output is operated with a negative control voltage during a positive half-wave, and with a comparatively higher potential during a negative half-wave.

29. The electric power tool as claimed in claim 22, characterized in that the bias voltage output is operated with a negative control voltage of −5 volts during a positive half-wave, and with a comparatively higher potential of zero volts during a negative half-wave.

30. A method for operating an electric power tool as clamed in claim 22 with alternating current, with an electric motor being supplied with electrical energy by means of an electronic control device by virtue of phase gating control using an electric power switch, characterized in that monitoring is performed immediately after initial triggering of the power switch by tapping off the voltage at a summation point of a voltage divider and a check is made as to whether the power switch is on, in that, after the initial triggering, the power switch is triggered again if the power switch was not on or had returned to the off state during monitoring, and in that this check and possibly renewed triggering of the power switch is repeated within a half-wave of the AC voltage.

31. The electric power tool as claimed in claim 1, characterized in that the electronic control device is formed such that post-triggering is performed immediately, as soon as the check of the signal at the detection input has shown that the power switch is off.

32. The electric power tool as claimed in claim 1, characterized in that the electronic control device is designed such that the triggering sequence lasts for 50-500 µs.

33. The electric power tool as claimed in claim 1, characterized in that the electronic control device is designed such that the triggering period of the power switch lasts for 5-40 µs.

34. The electric power tool as claimed in claim 1, characterized in that the electronic control device comprises a synchronization input in order to detect the zero crossing of the respective half-wave.

35. The electric power tool as claimed in claim 1, characterized in that the bias voltage output is operated with a negative control voltage, during a positive half-wave, and with a comparatively higher potential during a negative half-wave.

36. A method for operating an electric power tool as clamed in claim 1 with alternating current, with an electric motor being supplied with electrical energy by means of an electronic control device by virtue of phase gating control using an electric power switch, characterized in that monitoring is performed immediately after initial triggering of the power switch by tapping off the voltage at a summation point of a voltage divider and a check is made as to whether the power switch is on, in that, after the initial triggering, the power switch is triggered again if the power switch was not on or had returned to the off state during monitoring, and in that this check and possibly renewed triggering of the power switch is repeated within a half-wave of the AC voltage.

37. The electric power tool as claimed in claim 1, characterized in that the electronic control device is designed such that the triggering period of the power switch lasts for 200-300 μs.

38. The electric power tool as claimed in claim 1, characterized in that the bias voltage output is operated with a negative control voltage of −5 volts during a positive half-wave, and with a comparatively higher potential of zero volts during a negative half-wave.

* * * * *